United States Patent [19]

Hauser

[11] 4,159,875

[45] Jul. 3, 1979

[54] SPECIMEN HOLDER

[75] Inventor: Stephen G. Hauser, Tarzana, Calif.

[73] Assignee: Abbott Laboratories, North Chicago, Ill.

[21] Appl. No.: 734,582

[22] Filed: Oct. 21, 1976

[51] Int. Cl.[2] .......... G02B 21/34

[52] U.S. Cl. .......... 356/244; 350/92

[58] Field of Search .......... 350/92, 93, 94, 95; 356/244

[56] References Cited

U.S. PATENT DOCUMENTS

| | | | |
|---|---|---|---|
| 1,264,489 | 4/1918 | Cobb | 350/92 |
| 2,761,558 | 9/1956 | McLean, Jr. | 350/92 X |
| 2,776,596 | 1/1957 | Eigen | 350/95 X |
| 3,432,275 | 3/1969 | Unger | 350/95 X |
| 3,533,744 | 10/1970 | Unger | 356/39 X |
| 3,951,512 | 4/1976 | Tolles | 350/92 X |

FOREIGN PATENT DOCUMENTS

| | | | |
|---|---|---|---|
| 2230565 | 1/1973 | Fed. Rep. of Germany | 356/244 |
| 1166726 | 11/1958 | France | 350/92 |
| 1283929 | 8/1972 | United Kingdom | 356/244 |

*Primary Examiner*—John K. Corbin
*Assistant Examiner*—Matthew W. Koren
*Attorney, Agent, or Firm*—Neal O. Willmann

[57] ABSTRACT

A slide holder is disclosed which is suitable for use in an automated differential blood cell classifier. The molded plastic holder provides a readily identifiable, stackable, and nestable device for protectively handling, positioning, and transporting a specimen such as a film of blood to be analyzed.

9 Claims, 7 Drawing Figures

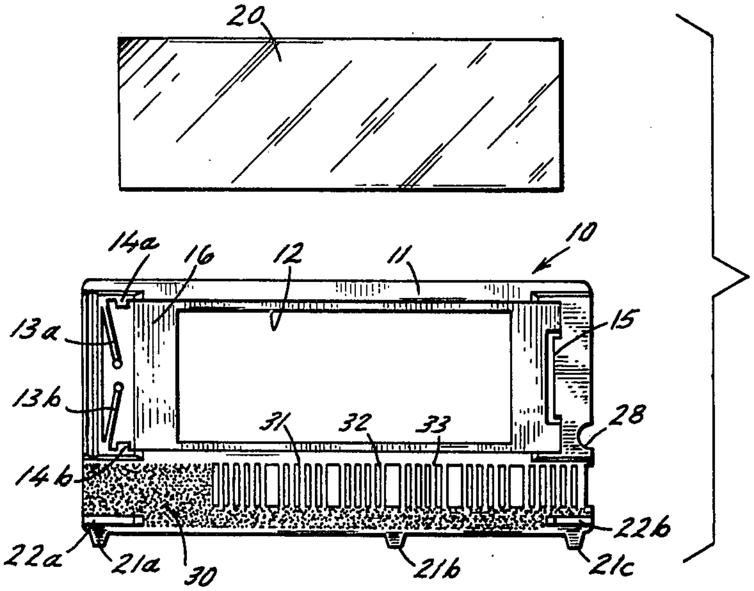
FIG. 1.
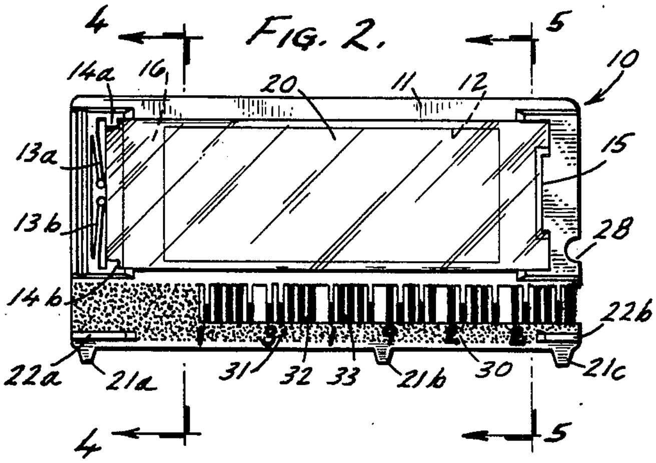
FIG. 2.
FIG. 4.
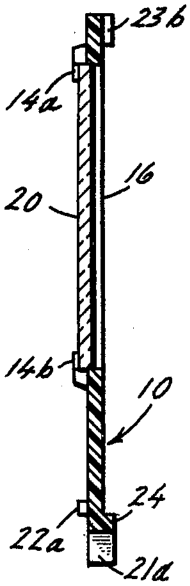
FIG. 5.
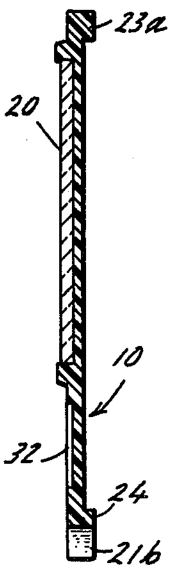
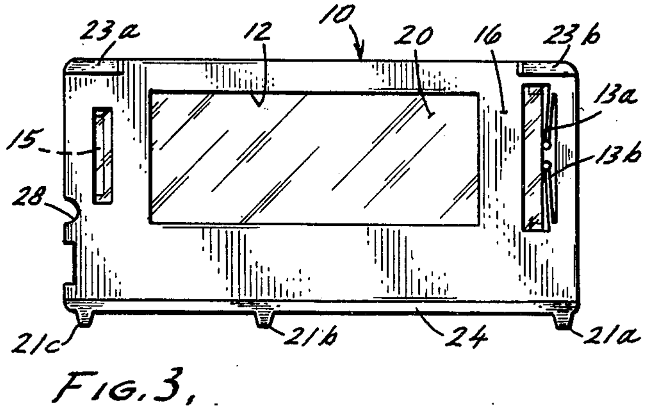
FIG. 3.

SPECIMEN HOLDER

BACKGROUND OF THE INVENTION

The present invention relates to a specimen holder. In general, it concerns a device for protectively manipulating a film-like specimen to be analyzed. More particularly, it provides a molded plastic slide holder which can be transported, stacked, and nestled with other such holders.

In several different fields of technology, automated analysis of samples or specimens is of continuing interest. For example, in the medical or health care field various instruments for automated blood cell analysis, e.g., classification and counting, have been disclosed and marketed. Automated analytical instruments are also of current interest in the field of pollution analysis and control. In these, as well as other, technological fields, a variety of different automated instruments analyze a plurality of specimens each of which is generally in the form of a relatively thin film. For example, in automated differential blood cell analysis it is common practice to employ a specimen comprising a stained monolayer of blood cells on a glass microscope slide. U.S. Pat. No. 3,851,156, for example, discloses a method and apparatus particularly suitable for automated differential blood cell analysis.

A specimen holder which is suitable for use with an automated analytical instrument must, of course, hold the specimen in proper orientation or position for analysis within the particular instrument. In addition, it must permit the specimen to be transported or moved through the instrument, for example, from a sample input storage area through a scanning stage of the instrument and into a sample output storage area. During such transporting, as well as during any handling by a laboratory technician, it is usually important that the specimen be protected, for example, from scraping or abrasion from contact with other objects. In addition, it is desirable that specimens be in a form which permits their compact handling and storage. Thus, stackable and nestable forms of specimens offer certain advantages. It is also preferable that each of the various specimens be readily identifiable, to distinguish them one from another and to permit relating a particular specimen with its source.

Briefly, it has now been discovered according to the present invention that an improved specimen holder particularly suitable for use with automated instruments can be made by molding a suitable plastic material into the proper configuration as hereinafter described.

BRIEF DESCRIPTION OF THE DRAWINGS

The present invention will be better understood from the following detailed description of a preferred embodiment and by reference to the accompanying illustrative drawings, in which:

FIG. 1 is a top view showing a glass slide and a slide holder of the present invention;

FIG. 2 is a top view, similar to FIG. 1, but showing the slide held encompassed by the slide holder;

FIG. 3 is a bottom view showing a preferred embodiment of a slide holder of the present invention;

FIGS. 4 and 5 are both enlarged, side sectional views taken along the lines 4—4 and 5—5, respectively, in FIG. 3;

DETAILED DESCRIPTION OF THE INVENTION

Figure 6:
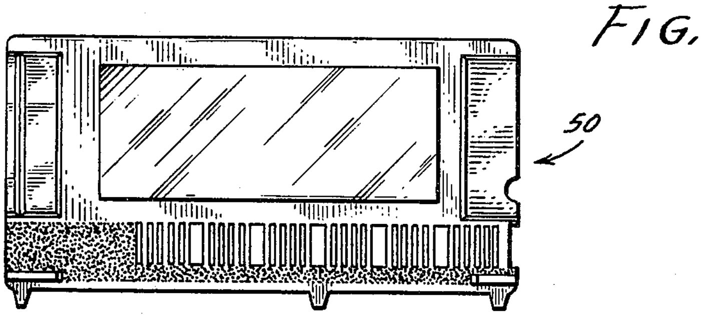
FIG. 6 is a top view showing another embodiment wherein a sample holder has an integral, transparent planar surface area.

Referring to FIGS. 1–5, a molded plastic slide holder 10 is shown in conjunction with a glass slide 20. The slide holder 10 generally comprises a carrier frame 11 surrounding or encompassing an opening or window 12. The holder 10 is provided with integral slide holding means composed of a pair of projections **14*a* and 14*b*, a spring 13*a* and 13*b*, a backing support 16 and a projection or lip 15 which cooperate together to hold glass slide 20 in proper position. As best shown in FIG. 2, the glass slide 20 is held in position with the backing support 16 abutting the edges of the bottom of the slide 20, while the lip 15 and projections 14*a* and 14*b* overlap and abut portions of the top of the slide 20. Integral spring 13*a* and 13*b* is biased to urge the slide 20 in the direction of lip 15**.

Carrier frame 11 is provided with alignment means, such as notch 28 and teeth **21*a*, 21*b* and 21*c* for properly and selectively positioning the holder. Alignment notch 28 permits the holder 10 to be easily and correctly aligned, for example, when stored in a stacked position in hopper 40 having a projection or ear 45 which must mate with the notch 28 in order for the holder 10 to enter the hopper 40. Teeth 21*a*, 21*b* and 21*c* help permit slide holder 10 to be automatically driven or moved by a transporting mechanism (not shown) such as worm gears, star gears and the like. The holder 10 has a first pair of spacer-stops 22*a* and 22*b* molded on its front surface. The back surface of slide holder 10 is provided with a second pair of spacer-stops 23*a* and 23*b* and a rib 24. These spacer-stops 22 and 23 and rib 24 help make the slide holder 10** stackable and nestable with other such slide holders.

In a preferred embodiment of the present invention, slide holder 10 contains one or more identification or encoding areas. As shown in FIGS. 1 and 2, slide holder 10 includes an opaque or frosted area 30 upon which, if desired, a laboratory technician can write or place an identifying symbol, such as a patient's name. In addition to providing an area 30 for a human readable code or indicia, the holder 10 also includes a molded bar code area 31 comprising six groups of five rectangular indents 32. In FIG. 1, code area 31 is shown prior to having any code applied. In FIG. 2, a machine readable code has been applied, for example, by techniques known in the art, such as hot stamping. Rectangular indents 32 provide a series of raised areas 33 between indents 32 which facilitate application of a machine readable bar code by providing well defined, or crisp, edges.

As is shown in FIG. 6, the specimen holder, in another embodiment of the present invention, can be integral or one piece and thus not employ a separate glass slide but rather be a single piece, molded from plastic material which exhibits suitable transparency.

Figure 7:
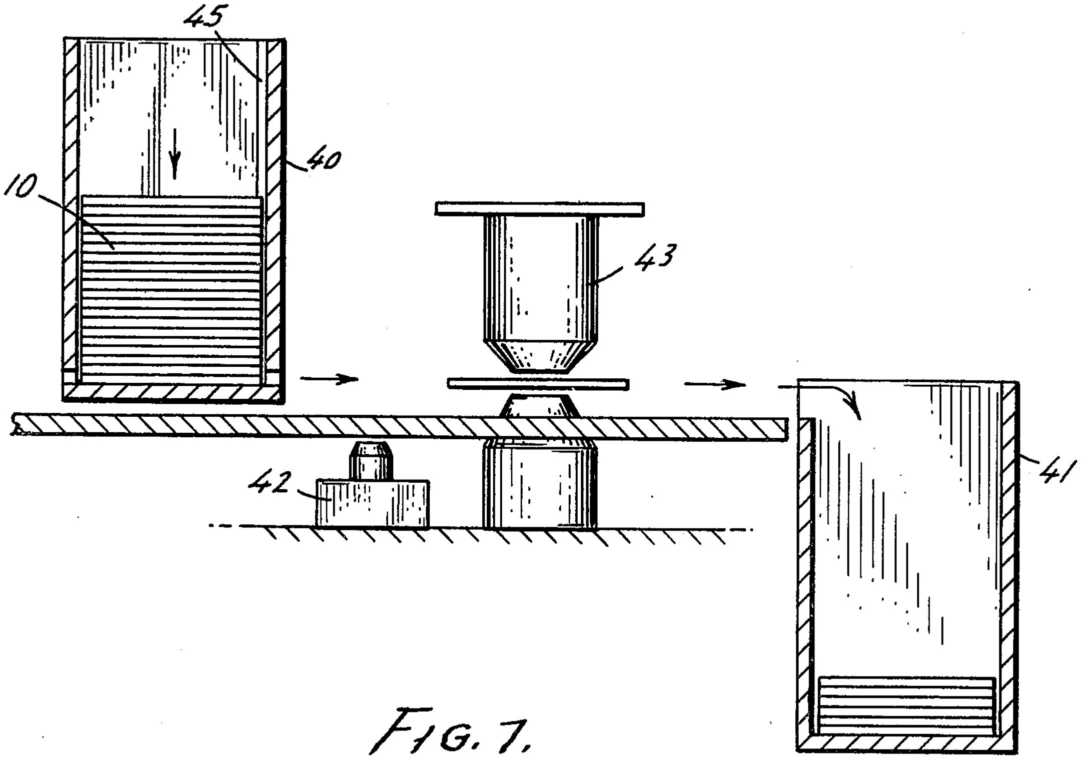
FIG. 7 is an end view, partially pictorial and partially diagramatic, showing slide holders of the present invention being used with an apparatus for automatically counting and classifying the blood cells in specimens on the slide holders.

Referring to FIG. 7, a plurality of slide holders 10 of the present invention are shown in use with an apparatus for automatically counting and classifying blood cells. The apparatus includes an input storage container or hopper 40 and an output container or hopper 41, a scanner 42 and a lens system 43. Ear 45 on an inside wall of hopper 41 mates with notch 28 on holder 10 to properly orient each holder 10. Stacked and nestled slide holders 10 are moved one at a time by a transporting device (not shown) from hopper 40 past scanner 42, which optically reads the different codes appearing on each slide holder 10. The slide holder 10 then passes between lens system 43 which illuminates and optically views the specimen, for example, as described in U.S. Pat. No. 3,851,156. Finally, the slide holder 10 is transported from the lens system 43 and stored in hopper 41.

As mentioned above, the specimen holder is preferably constructed from a molded plastic material. Suitable plastics will be apparent to those skilled in the art and will generally provide relatively rigid, transparent molded products. For example, polycarbonates, polyacrylates and polymethacrylates may be employed.

Having described in detail a preferred embodiment of my invention it will be apparent to those skilled in the art that numerous modifications can be made without parting from the scope of the invention.

What is claimed is:

1. A slide holder for accommodating a planar specimen slide which comprises:
   (a) a molded frame to accommodate said slide;
   (b) integral cooperating slide holding means for retaining said slide defined by said frame;
   (c) nesting means defined by opposing sides of said frame to cooperate with corresponding nesting means of vertically stacked adjacent slide holders to permit movement of one slide holder in one direction while preventing movement in a direction substantially transverse thereto; and,
   (d) transport means operatively associated with said frame to permit mechanical transfer of said slide holder.

2. A slide holder according to claim 1 wherein said frame includes an encoding area.

3. A slide holder according to claim 2 wherein said encoding area is machine readable.

4. A slide holder according to claim 2 wherein said encoding area is human readable.

5. A slide holder according to claim 1 wherein said frame can accommodate a glass planar specimen slide.

6. A slide holder according to claim 1 wherein said frame can accommodate a plastic planar specimen slide.

7. A slide holder according to claim 1 wherein said integral cooperating slide holding means includes a resilient biasing means.

8. A specimen holder which comprises:
   (a) a planar specimen slide;
   (b) a molded frame to accommodate said slide;
   (c) integral cooperating slide holding means for retaining said slide in said frame;
   (d) nesting means defined by opposing sides of said frame to cooperate with corresponding nesting means of vertically stacked adjacent specimen holders constructed in a range to permit movement of one slide holder in one direction while preventing movement in a direction substantially transverse thereto; and,
   (e) transport means operatively associated with said frame to permit mechanical transfer of said specimen holder.

9. A specimen holder which comprises:
   (a) an integral planar specimen slide;
   (b) a frame encompassing said slide;
   (c) nesting means defined by opposing sides of said frame to cooperate with corresponding nesting means of vertically stacked adjacent specimen holders to permit movement of one slide holder in one direction while preventing movement in a direction substantially transverse thereto; and,
   (d) transport means operatively associated with said frame to permit mechanical transfer of said specimen holder.

* * * * *